(12) United States Patent
Kelley et al.

(10) Patent No.: US 7,033,703 B2
(45) Date of Patent: Apr. 25, 2006

(54) COMPOSITE MATERIAL AND CURRENT COLLECTOR FOR BATTERY

(75) Inventors: Kurtis C. Kelley, Washington, IL (US); Charles F. Ostermeier, Ames, IA (US); Matthew J. Maroon, Grayslake, IL (US)

(73) Assignee: Firefly Energy, Inc., Peoria, IL (US)

( * ) Notice: Subject to any disclaimer, the term of this patent is extended or adjusted under 35 U.S.C. 154(b) by 446 days.

(21) Appl. No.: 10/324,068

(22) Filed: Dec. 20, 2002

(65) Prior Publication Data

US 2004/0121237 A1 Jun. 24, 2004

(51) Int. Cl.
*H01M 4/66* (2006.01)
(52) U.S. Cl. .............. 429/245; 429/233; 429/236; 429/241; 252/502; 29/2
(58) Field of Classification Search .............. 429/245, 429/232, 233, 236, 241; 252/502; 29/2
See application file for complete search history.

(56) References Cited

U.S. PATENT DOCUMENTS

| | | |
|---|---|---|
| 1,285,660 A | 11/1918 | Ford |
| 2,620,369 A | 12/1952 | Daniel .................. 136/111 |
| 2,658,099 A | 11/1953 | Basset .................. 136/121 |
| 2,843,649 A | 7/1958 | Louis .................. 136/111 |
| 3,021,379 A | 2/1962 | Jackel .................. 136/145 |
| 3,188,242 A | 6/1965 | Kordesch et al. ............ 136/86 |
| 3,442,717 A | 5/1969 | Horn et al. .............. 136/176 |
| 3,510,359 A | 5/1970 | Selover, Jr. et al. ........ 136/146 |
| 3,565,694 A | 2/1971 | Chireau .................. 136/121 |
| 3,597,829 A | 8/1971 | Wagner et al. ............ 29/420.5 |
| 3,635,676 A | 1/1972 | Sands |
| 3,832,426 A | 8/1974 | Malthouse et al. |
| 3,833,424 A | 9/1974 | Louis et al. .................. 136/86 |
| 3,857,913 A | 12/1974 | Crow et al. |
| 3,960,770 A | 6/1976 | Raley, Jr. et al. |
| 4,011,374 A | 3/1977 | Kaun .................. 429/220 |
| 4,086,404 A | 4/1978 | Vissers et al. ............ 429/220 |
| 4,098,967 A | 7/1978 | Biddick et al. ............ 429/210 |
| 4,125,676 A | 11/1978 | Maricle et al. |
| 4,134,192 A | 1/1979 | Parkinson et al. ............ 29/2 |
| 4,152,825 A | 5/1979 | Bruneau .................. 29/623.2 |
| 4,188,464 A | 2/1980 | Adams et al. ............ 429/210 |
| 4,224,392 A | 9/1980 | Oswin .................. 429/206 |
| 4,275,130 A | 6/1981 | Rippel et al. ............ 429/144 |
| 4,339,322 A | 7/1982 | Balko et al. ............ 204/255 |
| 4,363,857 A | 12/1982 | Mix .................. 429/234 |
| 4,374,186 A | 2/1983 | McCartney et al. ........ 429/154 |
| 4,485,156 A | 11/1984 | Tokunaga .................. 429/204 |
| 4,566,877 A | 1/1986 | Pazdej et al. |

(Continued)

FOREIGN PATENT DOCUMENTS

EP 0 555 978 A1 8/1993

(Continued)

OTHER PUBLICATIONS http://www.powertechnologyonline.com/progress.html, Power Technology, Inc., Jan. 15, 2002.

(Continued)

*Primary Examiner*—Laura Weiner
(74) *Attorney, Agent, or Firm*—Finnegan, Henderson, Farabow, Garrett & Dunner, LLP.

(57) ABSTRACT

A composite material including a first carbon foam structure including a network of pores and a second carbon foam structure including a network of pores. An intermediate bonding structure is disposed at least in part between the first and second carbon foam structures.

27 Claims, 4 Drawing Sheets

U.S. PATENT DOCUMENTS

| | | | |
|---|---|---|---|
| 4,717,633 A | 1/1988 | Hauser | 429/209 |
| 4,749,451 A | 6/1988 | Naarmann | 204/58.5 |
| 4,758,473 A | 7/1988 | Herscovici et al. | 428/408 |
| 4,832,870 A | 5/1989 | Clough et al. | |
| 4,865,931 A | 9/1989 | McCullough, Jr. et al. | 429/194 |
| 4,900,643 A | 2/1990 | Eskra et al. | 429/241 |
| 5,017,446 A | 5/1991 | Reichman et al. | 421/225 |
| 5,106,709 A | 4/1992 | Tekkanat et al. | 429/210 |
| 5,162,172 A | 11/1992 | Kaun | 429/155 |
| 5,200,281 A | 4/1993 | Leap et al. | 429/129 |
| 5,208,003 A | 5/1993 | Simandl et al. | |
| 5,223,352 A | 6/1993 | Pitts et al. | 429/225 |
| 5,229,228 A | 7/1993 | Doniat et al. | 429/234 |
| 5,260,855 A | 11/1993 | Kaschmitter et al. | 361/502 |
| 5,268,395 A | 12/1993 | Simandl et al. | |
| 5,300,272 A | 4/1994 | Simandl et al. | |
| 5,348,817 A | 9/1994 | Rao et al. | 429/210 |
| 5,374,490 A | 12/1994 | Aldecoa | 429/152 |
| 5,393,619 A | 2/1995 | Mayer et al. | 429/152 |
| 5,395,709 A | 3/1995 | Bowker et al. | 429/152 |
| 5,402,306 A | 3/1995 | Mayer et al. | 361/502 |
| 5,411,818 A | 5/1995 | Barlow et al. | 429/185 |
| 5,426,006 A | 6/1995 | Delnick et al. | 429/218 |
| 5,429,893 A | 7/1995 | Thomas | 429/218 |
| 5,441,824 A | 8/1995 | Rippel | 429/53 |
| 5,474,621 A | 12/1995 | Barnard | 136/256 |
| 5,498,489 A | 3/1996 | Dasgupta et al. | 424/152 |
| 5,508,131 A | 4/1996 | Bowen et al. | 429/210 |
| 5,512,390 A | 4/1996 | Obushenko | 429/204 |
| 5,529,971 A | 6/1996 | Kaschmitter et al. | |
| 5,538,810 A | 7/1996 | Kaun | 429/129 |
| 5,543,247 A | 8/1996 | Pulley et al. | 429/129 |
| 5,563,007 A | 10/1996 | Young et al. | 429/139 |
| 5,569,563 A | 10/1996 | Ovshinsky et al. | 429/223 |
| 5,580,676 A | 12/1996 | Honda et al. | 429/131 |
| 5,593,797 A | 1/1997 | Brecht | |
| 5,595,840 A | 1/1997 | Henning et al. | 429/210 |
| 5,626,977 A | 5/1997 | Mayer et al. | |
| 5,636,437 A | 6/1997 | Kaschmitter et al. | 29/825 |
| 5,643,684 A | 7/1997 | Tsubouchi et al. | 428/605 |
| 5,667,909 A | 9/1997 | Rodriguez et al. | 429/127 |
| 5,677,075 A | 10/1997 | Fujita | 429/48 |
| 5,705,259 A | 1/1998 | Mrotek et al. | 428/209 |
| 5,712,054 A | 1/1998 | Kejha | 429/21 |
| 5,723,232 A | 3/1998 | Yamada et al. | 429/245 |
| 5,738,907 A | 4/1998 | Vaccaro et al. | 427/172 |
| 5,766,797 A | 6/1998 | Crespi et al. | 429/231.8 |
| 5,882,621 A | 3/1999 | Doddapaneni et al. | 423/445 |
| 5,888,469 A | 3/1999 | Stiller et al. | |
| 5,898,564 A | 4/1999 | Mayer et al. | |
| 5,932,185 A | 8/1999 | Pekala et al. | |
| 5,955,215 A | 9/1999 | Kurzweil et al. | 429/41 |
| 5,993,996 A | 11/1999 | Firsich | 429/231.8 |
| 6,001,761 A | 12/1999 | Hata et al. | 501/103 |
| 6,033,506 A | 3/2000 | Klett | |
| 6,037,032 A | 3/2000 | Klett et al. | |
| 6,045,943 A | 4/2000 | Nowaczyk | 429/160 |
| 6,060,198 A | 5/2000 | Snaper | 429/233 |
| 6,077,464 A | 6/2000 | Murdie et al. | |
| 6,077,623 A | 6/2000 | Grosvenor et al. | 429/210 |
| 6,103,149 A | 8/2000 | Stankiewicz | |
| 6,117,592 A | 9/2000 | Hoshino et al. | 429/235 |
| 6,127,061 A | 10/2000 | Shun et al. | 429/40 |
| 6,146,780 A | 11/2000 | Cisar et al. | 429/34 |
| 6,183,854 B1 | 2/2001 | Stiller et al. | |
| 6,193,871 B1 | 2/2001 | Coates et al. | 205/170 |
| 6,217,841 B1 | 4/2001 | Grindatto et al. | |
| 6,241,957 B1 | 6/2001 | Stiller et al. | |
| 6,245,461 B1 | 6/2001 | Smith et al. | 429/231.8 |
| 6,248,467 B1 | 6/2001 | Wilson et al. | 429/39 |
| 6,258,473 B1 | 7/2001 | Spillman et al. | 429/9 |
| 6,261,485 B1 | 7/2001 | Klett | |
| 6,287,721 B1 | 9/2001 | Xie et al. | 429/152 |
| 6,296,746 B1 | 10/2001 | Broman et al. | 204/294 |
| 6,316,148 B1 | 11/2001 | Timmons et al. | 429/241 |
| 6,319,627 B1 | 11/2001 | Snyder et al. | 429/62 |
| 6,323,160 B1 | 11/2001 | Murdie et al. | |
| 6,332,990 B1 | 12/2001 | Mayer et al. | |
| 6,346,226 B1 | 2/2002 | Stiller et al. | |
| 6,379,845 B1 | 4/2002 | Inazawa et al. | 429/235 |
| 6,383,687 B1 | 5/2002 | Gibbons et al. | 429/233 |
| 6,387,343 B1 | 5/2002 | Klett | |
| 6,395,423 B1 | 5/2002 | Kawakami et al. | 429/215 |
| 6,399,149 B1 | 6/2002 | Klett et al. | |
| 6,438,964 B1 | 8/2002 | Giblin | |
| 6,500,401 B1 | 12/2002 | Reznek et al. | 423/445 |
| 6,528,204 B1 | 3/2003 | Hikmet et al. | 429/128 |
| 6,566,004 B1 | 5/2003 | Fly et al. | 429/39 |
| 6,569,559 B1 | 5/2003 | Rouillard et al. | 429/120 |
| 6,576,365 B1 | 6/2003 | Meitav et al. | 429/130 |
| 6,605,390 B1 | 8/2003 | Moore et al. | 429/231.8 |
| 6,631,073 B1 | 10/2003 | Sakata et al. | 361/502 |
| 2001/0019800 A1 | 9/2001 | Herreyre et al. | |
| 2002/0027066 A1 | 3/2002 | Kanno et al. | |
| 2002/0061436 A1 | 5/2002 | Inagaki et al. | |
| 2002/0081478 A1 | 6/2002 | Busenbender | |
| 2002/0114990 A1 | 8/2002 | Fly et al. | |
| 2002/0136680 A1 | 9/2002 | Kanno et al. | |
| 2002/0150822 A1 | 10/2002 | Marlow et al. | |
| 2003/0003343 A1 | 1/2003 | Cisar et al. | |
| 2003/0099884 A1 | 5/2003 | Chiang et al. | |
| 2003/0104280 A1 | 6/2003 | Venkatesan et al. | |
| 2003/0108785 A1 | 6/2003 | Wu et al. | |
| 2004/0002006 A1* | 1/2004 | Kelley et al. | 429/245 |

FOREIGN PATENT DOCUMENTS

| | | |
|---|---|---|
| EP | 1225160 | 7/2002 |
| GB | 18590 | 0/1910 |
| JP | 61270205 | 11/1986 |
| JP | 63057649 | 3/1988 |
| JP | 6418982 | 1/1989 |
| JP | 2002220217 | 8/2002 |
| WO | WO 95/06002 | 3/1995 |
| WO | WO 98/02382 | 1/1998 |
| WO | WO 98/27023 | 6/1998 |
| WO | WO 99/11585 | 3/1999 |
| WO | WO 99/11586 | 3/1999 |
| WO | WO 99/61549 | 12/1999 |
| WO | WO 99/64223 | 12/1999 |
| WO | WO 00/16418 | 3/2000 |
| WO | WO 00/43314 | 7/2000 |
| WO | WO 01/66490 | 9/2001 |
| WO | WO 02/18271 | 3/2002 |
| WO | WO 02/18272 | 3/2002 |
| WO | WO 02/094533 | 11/2002 |
| WO | WO 03/028130 | 4/2003 |

OTHER PUBLICATIONS

Czerwinski et al., "Electrochemical Behavior of Lead Dioxide Deposited on Reticulated Vitreous Carbon (RVC)," Journal of Power Sources, vol. 64, pp. 29-34, (1997).

Blood et al., "Electrodeposition of Lead Dioxide on Carbon Substrates From a High Internal Phase Emulsion (HIPE)," Journal of Applied Electrochemistry, vol. 34, pp. 1-7, (2004).

Davis, et al., "Electrochemical Characterization of a Microcellular Carbon Foam/Epoxy Composite Electrode," Analytical Chemistry, vol. 62, No. 10, May 15, 1990, pp. 1000-1003.

* cited by examiner

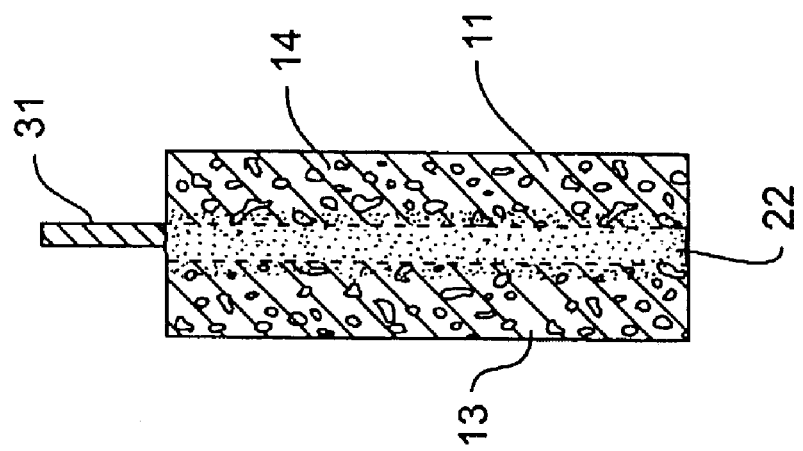
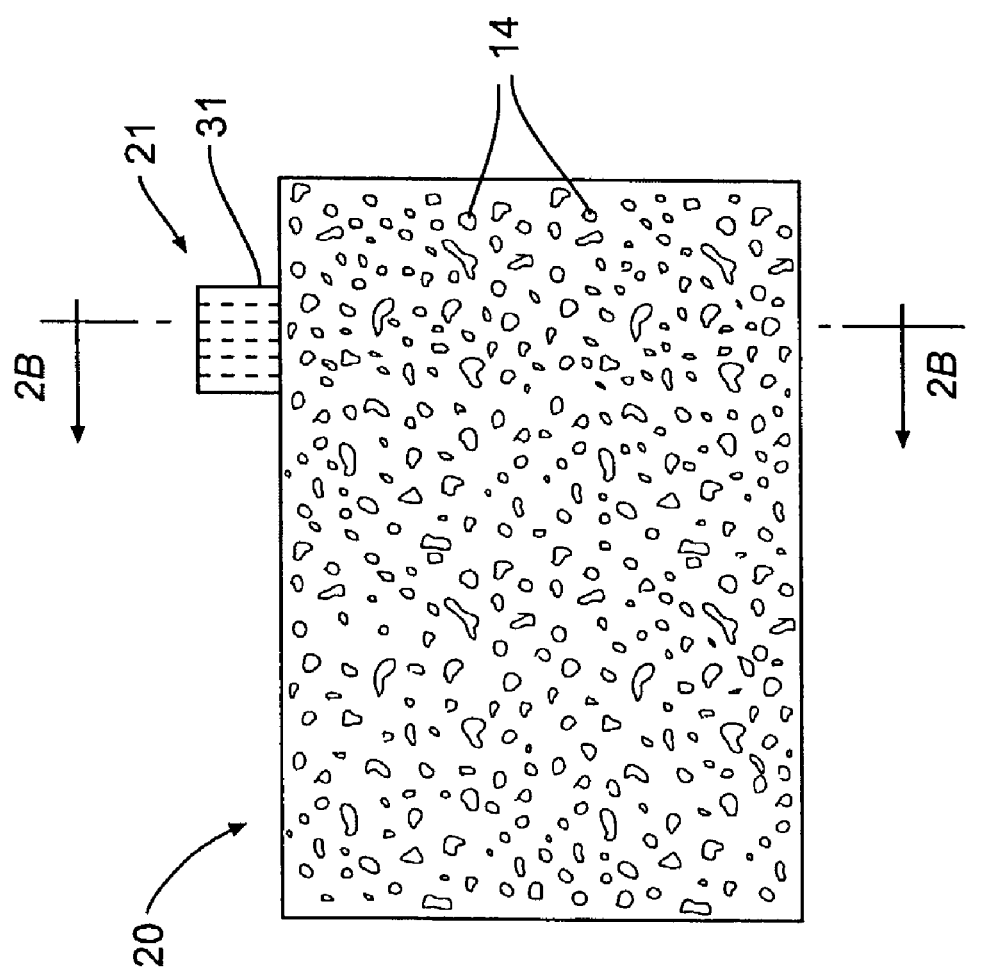

COMPOSITE MATERIAL AND CURRENT COLLECTOR FOR BATTERY

TECHNICAL FIELD

This invention relates generally to a composite material and, more particularly, to a composite material current collector for an energy storage device.

BACKGROUND

Lead acid batteries are known to include at least one positive current collector, at least one negative current collector, and an electrolytic solution including, for example, sulfuric acid ($H_2SO_4$) and distilled water. Ordinarily, both the positive and negative current collectors in a lead acid battery are constructed from lead. The role of these lead current collectors is to transfer electric current to and from the battery terminals during the discharge and charging processes. Storage and release of electrical energy in lead acid batteries is enabled by chemical reactions that occur in a paste disposed on the current collectors. The positive and negative current collectors, once coated with this paste, are referred to as positive and negative plates, respectively. A notable limitation on the durability of lead acid batteries is corrosion of the lead current collector of the positive plate.

The rate of corrosion of the lead current collector is a major factor in determining the life of the lead acid battery. Once the sulfuric acid electrolyte is added to the battery and the battery is charged, the current collector of each positive plate is continually subjected to corrosion due to its exposure to sulfuric acid and to the anodic potentials of the positive plate. One of the most damaging effects of this corrosion of the positive plate current collector is volume expansion. Particularly, as the lead current collector corrodes, lead dioxide is formed from the lead source metal of the current collector. This lead dioxide corrosion product has a greater volume than the lead source material consumed to create the lead dioxide. Corrosion of the lead source material and the ensuing increase in volume of the lead dioxide corrosion product is known as volume expansion.

Volume expansion induces mechanical stresses on the current collector that deform and stretch the current collector. At a total volume increase of the current collector of approximately 4% to 7%, the current collector may fracture. As a result, battery capacity drops, and eventually, the battery will reach the end of its service life. Additionally, at advanced stages of corrosion, internal shorting within the current collector and rupture of the cell case can occur. Both of these corrosion effects may lead to failure of one or more of the cells within the battery.

One method of extending the service life of a lead acid battery is to increase the corrosion resistance of the current collector of the positive plate. Several methods have been proposed for inhibiting the corrosion process in lead acid batteries. Because carbon does not oxidize at the temperatures at which lead acid batteries generally operate, some of these methods have involved using carbon in various forms to slow or prevent the detrimental corrosion process in lead acid batteries. For example, U.S. Pat. No. 5,512,390 (hereinafter the '390 patent) discloses a lead acid battery that includes current collectors made from graphite plates instead of lead. The graphite plates have sufficient conductivity to function as current collectors, and they are more corrosion resistant than lead. Substituting graphite plates for the lead current collectors may, therefore, lengthen the life of a lead acid battery.

While the battery of the '390 patent may potentially offer a lengthened service life as a result of reduced corrosion at the positive plate, the graphite plates of the '390 patent are problematic. For example, the graphite plates of the '390 patent are dense, flat sheets of material each having a relatively small amount of surface area. Unlike lead electrode plates of a conventional lead acid battery, which are generally patterned into a grid-like structure to increase the available surface area of the plates, the graphite plates of the '390 patent are smooth sheets with no patterning. In lead acid batteries, an increase in surface area of the current collector may increase the specific energy of the battery and, therefore, may translate into improved battery performance. More surface area on the current collectors may also lead to a reduction in the time required for charging and discharging of the battery. The relatively small surface area of the graphite plates of the '390 patent results in poorly performing batteries that have slow charging speeds.

Additionally, the graphite plates of the '390 patent lack the toughness of lead current collectors. The dense graphite plates of the '390 patent are brittle and may fracture when subjected to physical shock or vibration. Such physical shock and vibration commonly occur in vehicular applications, for example. Any fracturing of the graphite plates would lead to the same problems caused by volume expansion of ordinary lead current collectors. Therefore, despite offering an increased resistance to corrosion compared to conventional lead current collectors, the brittle nature of the graphite plates of the '390 patent could actually result in battery service lives shorter than those possible through use of ordinary lead current collectors.

SUMMARY OF THE INVENTION

One aspect of the present invention includes a composite material. The composite material includes a first carbon foam structure including a network of pores and a second carbon foam structure including a network of pores. An intermediate bonding structure is disposed at least in part between the first and second carbon foam structures.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention. In the drawings:

FIG. 2A is a plan view of a current collector in accordance with an exemplary embodiment of the present invention;

FIG. 2B is a cross-sectional view of the current collector of FIG. 2A taken along the line 2A;

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limited sense. Wherever possible, the same reference numbers are used throughout the drawings to refer to the same or like parts.

Figure 1:
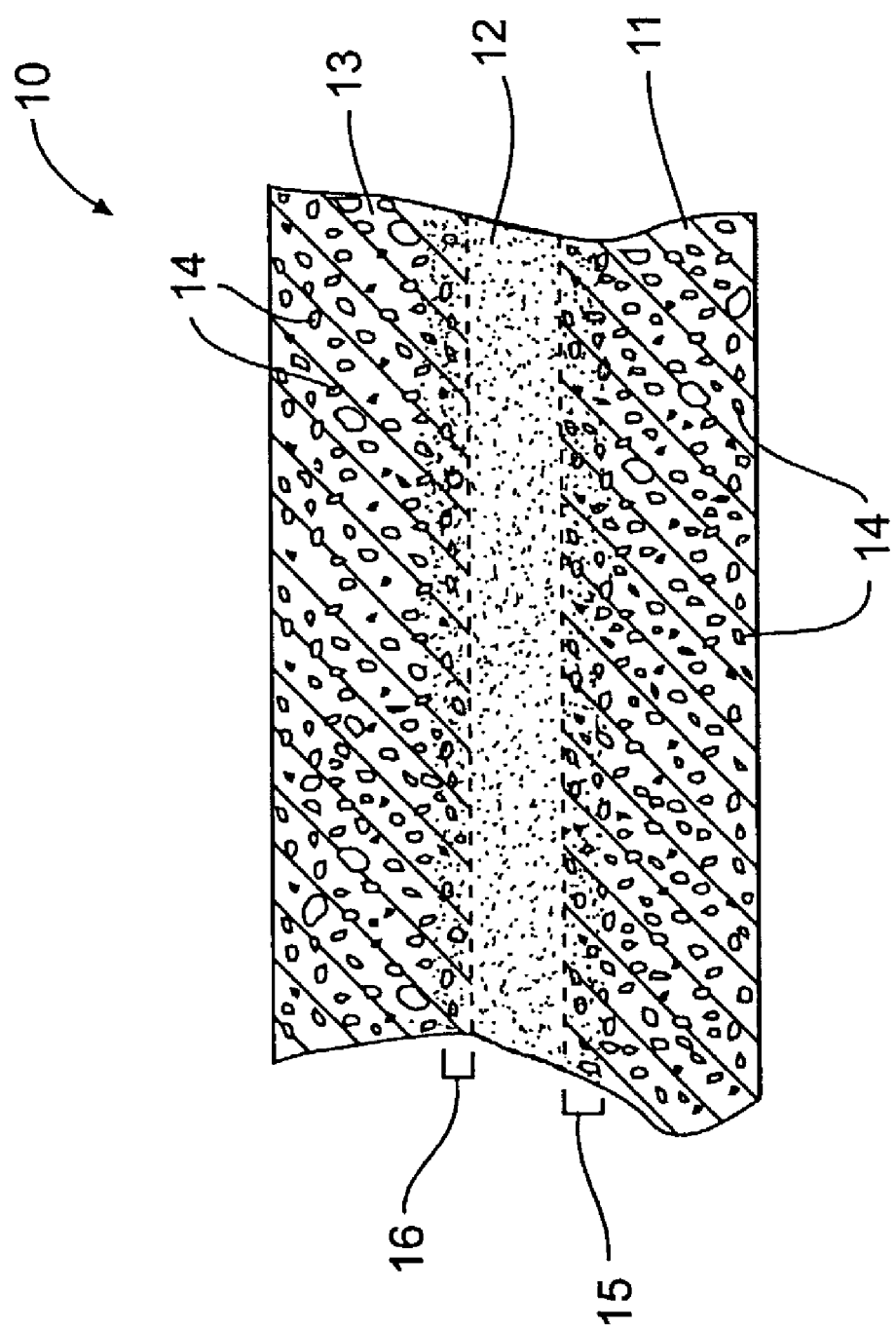
FIG. 1 is a cross-sectional view of a composite material in accordance with an exemplary embodiment of the present invention.

As shown in FIG. 1, according to one embodiment of the invention, composite material 10 includes two layers of porous carbon foam 11, 13. A intermediate bonding material 12 is disposed between carbon foam layers 11 and 13. Bonding material 12 attaches carbon foam layers 11 and 13 together and provides structural support for composite material 10.

The carbon foam used to form carbon foam layers 11 and 13 of composite material 10 is electrically conductive. In certain forms, the carbon foam may offer sheet resistivity values of less than about 1 ohm/cm. In still other forms, the carbon foam may have sheet resistivity values of less than about 0.75 ohm/cm. The electrical conductivity of carbon foam layers 111 and 13 allows composite material 10 to be used in a variety of applications such as, for example, current collectors in batteries.

The carbon foam used to form carbon foam layers 11 and 13 of composite material 10 is also resistant to corrosion. In general, carbon oxidizes only at very high temperatures and will resist corrosion even in corrosive environments. The carbon foam used in composite material 10 retains this corrosion resistance, and therefore, composite material 10 may be used, for example, in the corrosive environment of a lead acid battery.

Additionally, carbon foam layers 11 and 13 are lightweight due to the presence of a network of pores 14. In one embodiment of the invention, for example, the carbon foam may include a total porosity value of at least about 60%. In other words, at least 60% of the volume of carbon foam layers 11 and 13 is included within pores 14. Moreover, the carbon foam may have an open porosity value of at least about 90%. In other words, at least 90% of pores 14 are open to adjacent pores such that the network of pores 14 forms a substantially open network. This open network of pores 14 may result in a density of less than about 0.6 gm/cm3 for each of carbon foam layers 11 and 13. Further, the average pore size of the carbon foam may be between about 0.25 mm and about 2.0 mm, although other sizes may also be possible.

In addition to carbon foam, graphite foam may also be used to form composite material 10. One such graphite foam, under the trade name PocoFoam™, is available from Poco Graphite, Inc. The density and pore structure of graphite foam may be similar to carbon foam. A primary difference between graphite foam and carbon foam is the orientation of the carbon atoms that make up the structural elements of the foam. For example, in carbon foam, the carbon may be primarily amorphous. In graphite foam, however, much of the carbon is ordered into a graphite, layered structure. Because of the ordered nature of the graphite structure, graphite foam offers higher conductivity than carbon foam. PocoFoaM™ graphite foam exhibits electrical resistivity values of between about 100 µΩ/cm and about 400 µΩ/cm.

In composite material 10, bonding material 12 is disposed between carbon foam layers 11 and 13. Bonding material 12 attaches carbon foam layers 11 and 13 together by permeating at least some of pores 14 of carbon foam layer 11 and at least some of pores 14 of carbon foam layer 13. In an exemplary embodiment, bonding material 12 permeates the pores of carbon foam layer 11 by a depth equal to or greater than an average pore size of layer 11. Similarly, in the exemplary embodiment, bonding material 12 may permeate the pores of carbon foam layer 13 by a depth equal to or greater than an average pore size of layer 13. The depth of permeation of bonding material 12 into carbon foam layers 11 and 13 is not limited to depths of at least the average pore size of layers 11 and 13. Rather, a suitable bond may be created with a penetration depth sufficient to include at least one carbon structure (e.g., elements bordering a pore) within foam layers 11 and 13. The permeation of bonding material 12 into carbon foam layers 11 and 13 is represented in FIG. 1 by permeation zones 15 and 16, respectively.

A variety of materials may be used as bonding material 12. Bonding material 12 may include an electrically insulating material including a polymer. For example, in one embodiment, bonding material 12 may include polypropylene. In yet another embodiment, bonding material 12 may include any of a wide range of epoxies. In still another embodiment, an electrically conductive material may be used as bonding material 12. Such electrically conductive materials may include, for example, various metals and electrically conductive polymers.

To make the composite material of one embodiment of the present invention, a bonding material may be applied to a sheet of carbon foam material. Next, a second sheet of carbon foam material may be placed on the bonding material to form a stacked structure. If the bonding material is applied as a solid, such as in the case of most polymers and metals, then heat may be applied to the stacked structure to soften and/or melt the bonding material. Softening and/or melting of the bonding material encourages permeation of the bonding material into the pores of the carbon foam. In addition to heat, pressure can also be applied to the stacked structure. The application of external pressure may aid in forcing the bonding material to permeate the pores of the carbon foam. In an exemplary embodiment of the present invention, heat and pressure are applied simultaneously. In certain situations, however, heat may be applied exclusive of pressure. In still other situations, the application of heat may occur separate from the application of pressure.

In instances where the bonding material is applied as a liquid, such as an epoxy, for example, the bonding material may permeate the pores of each of the two sheets of carbon foam without the need for applying heat or pressure. Nevertheless, even in the case of bonding materials applied as a liquid, the application of heat and/or pressure, either together or individually, may facilitate permeation of the bonding material into the pores of the carbon foam by reducing the viscosity of the bonding material.

FIGS. 2A and 2B illustrate a current collector 20 that includes the composite material of one embodiment of the present invention. As shown in FIGS. 2A and 2B, current collector 20 includes carbon foam layers 11 and 13 bonded together by a conductive bonding material 22. Bonding material 22 permeates at least some of the pores of the carbon foam layers 11 and 13. Further, bonding material 22 may permeate the pores of carbon foam layers 11 and 13 by a depth equal to or greater than an average pore size of layers 11 and 13, respectively.

An electrical connection element 21 is disposed within bonding material 22 and provides an external, electrical connection for current collector 20. Electrical connection element 21 includes a tab 31 that extends beyond an edge of either or both of carbon foam layers 11 and 13. Electrical connection element 21 also includes at least one electrically conductive portion (not shown) that extends within current collector 20. Electrical connection element 21 may be formed using various different conductive materials, such as but not limited to metals, suitable for providing an electrical connection to either or both of carbon foam layers 11 and 13.

In the exemplary embodiment shown in FIGS. 2A and 2B, bonding material 22 of current collector 20 is an electrically conductive material. For example, bonding material 22 may include a metal or an electrically conductive polymer. Because bonding material 22 is electrically conductive, an external electrical connection to current collector 20 may be made using only one electrical connection element 21. Particularly, tab 31 can make electrical contact to both carbon foam layers 11 and 13 through bonding material 22.

Figure 3B:
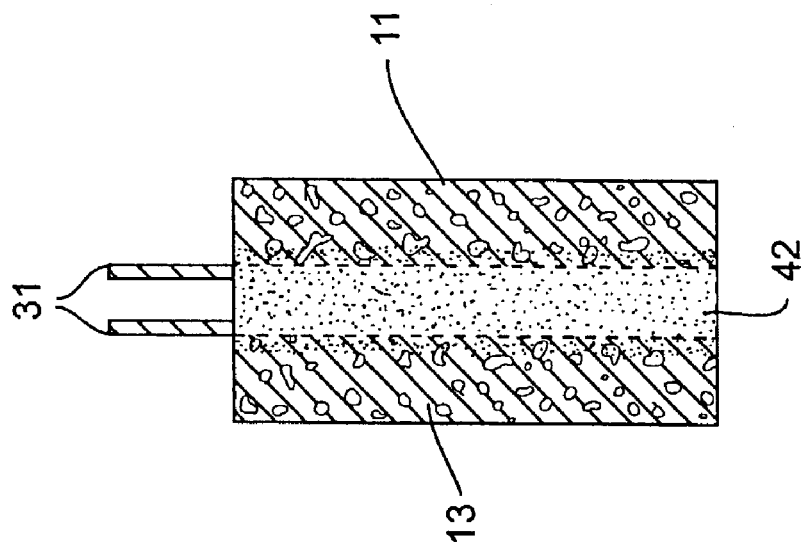
FIG. 3B is a cross-sectional view of the current collector of FIG. 3A taken along the line 3B.
Figure 3A:
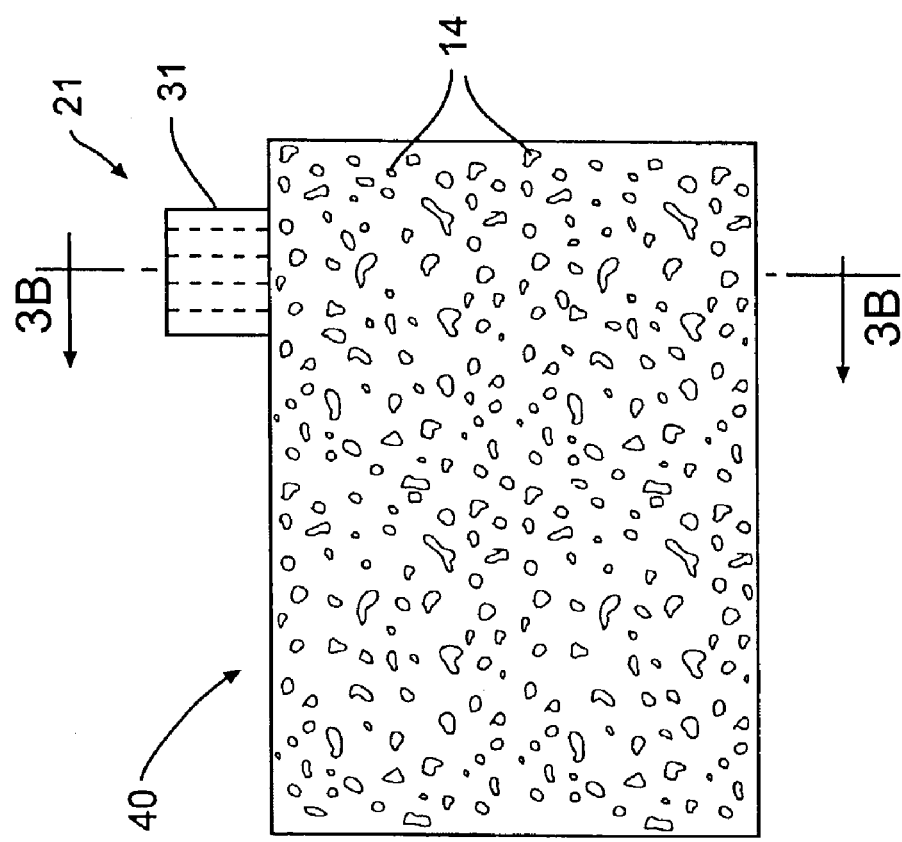
FIG. 3A is a plan view of another current collector in accordance with an exemplary embodiment of the present invention.

FIGS. 3A and 3B illustrate another current collector 40 including the composite material of the present invention. As shown in FIGS. 3A and 3B, current collector 40 includes carbon foam layers 11 and 13 bonded together by a bonding material 42. Similar to the bonding material of composite material 10, bonding material 42 permeates at least some of the pores of the carbon foam layers 11 and 13. Further, bonding material 42 may permeate the pores of carbon foam layers 11 and 13 by a depth equal to or greater than an average pore size of layers 11 and 13, respectively.

In the exemplary embodiment shown in FIGS. 3A and 3B, bonding material 42 is an electrically insulating material. Because bonding material 42 is electrically insulating, an external electrical connection to current collector 40 may be made using two electrical connection elements 21. Particularly, when making current collector 40, a first electrical connection element 21 may be disposed on, for example, carbon foam layer 11. Then, bonding material 42 is applied to both the first electrical connection element and to carbon foam layer 11. Because electrically insulating bonding material 42 coats the first electrical connection element 21, an additional electrical connection element may be required to make contact with carbon foam layer 13, which is applied to the bonding material 42 to create a stacked structure. Therefore, prior to placing carbon foam layer 13 on bonding material 42, a second electrical connection element 21 may be placed on bonding material 42. The second electrical connection element 21 provides an external electrical contact with carbon foam layer 13.

Accordingly, two electrical connection elements 21 are shown in FIG. 3B. Each resides at an interface between bonding material 42 and carbon foam layers 11 and 13, respectively. Electrical connection elements 21 may be configured with some open space or porosity so as not interfere with permeation of bonding material 42 into the pores of the respective carbon foam layers.

While the exemplary embodiment of the present invention illustrated in FIG. 3B includes two electrical connection elements 21, electrical connections to the carbon foam layers 11 and 13 may be accomplished through alternative configurations. For example, a single electrical connection element 21 may be configured such that electrically conductive portions 33 make electrical contact to both carbon foam layers 11 and 13. For example, conductive portions 33 may be arranged such that some of the conductive portions contact foam layer 11 and other conductive portions contact foam layer 13. Alternatively, electrical connection element 21 may be sized with a sufficient thickness relative to the thickness of bonding material 42 such that a single connection element 21 may contact both foam layers 11 and 13. In these exemplary instances, one electrical connection element 21 would be sufficient.

Figure 4:
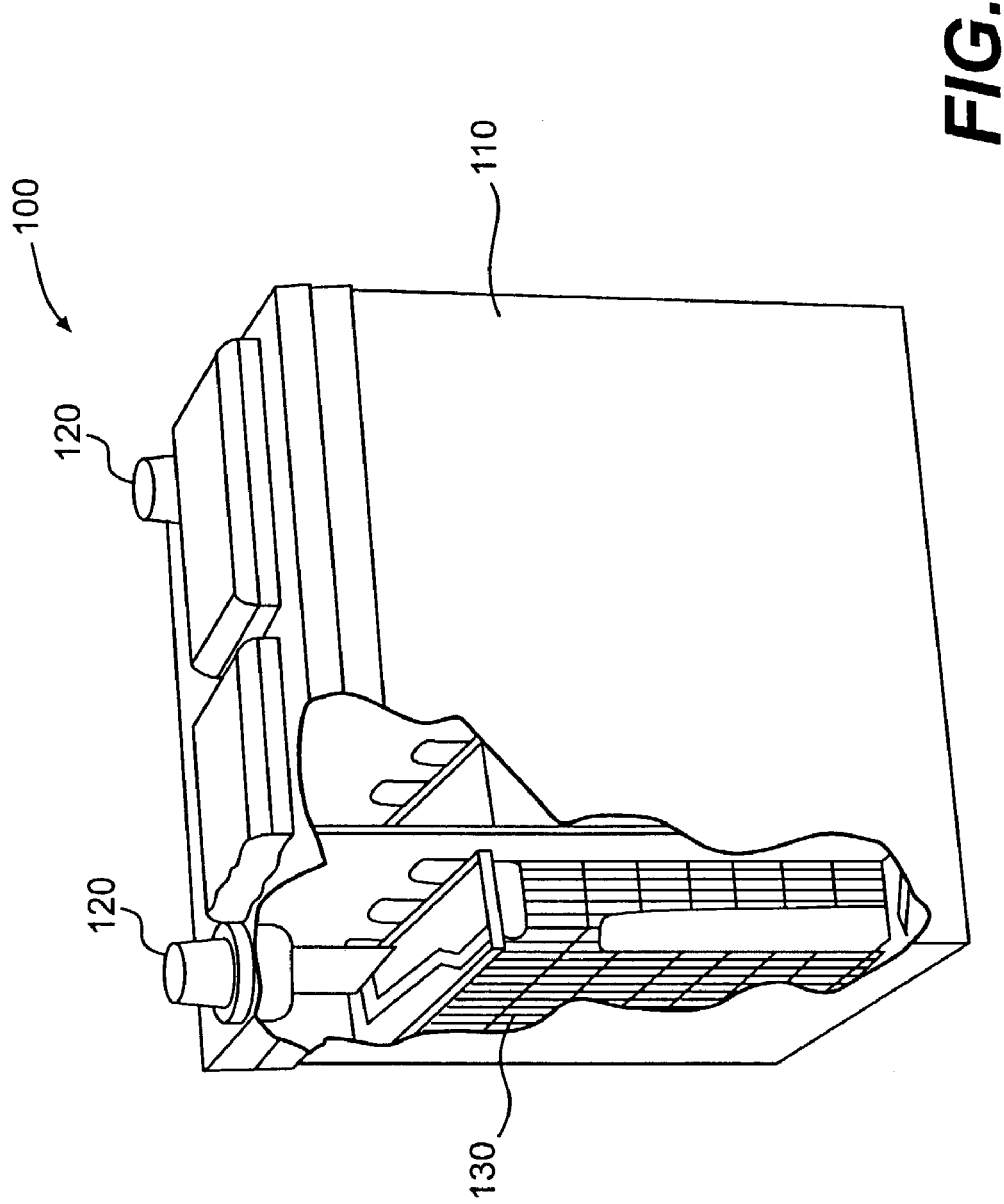
FIG. 4 is a diagrammatic cut-away representation of a battery in accordance with an exemplary embodiment of the present invention.

FIG. 4 illustrates a battery 100 in accordance with an exemplary embodiment of the present invention. Battery 100 includes a housing 110 and terminals 120, which are external to housing 110. At least one cell 130 is disposed within housing 110. While only one cell 130 is necessary, multiple cells may be connected in series to provide a desired total potential of battery 100.

Each cell 130 may be composed of alternating positive and negative plates immersed in an electrolytic solution including, for example, sulfuric acid and distilled water. Both the positive and negative plates include a current collector packed with a paste material, including, for example, an oxide of lead. As noted above, FIGS. 2A, 2B, 3A, and 3B illustrate current collectors 20 and 40 according to exemplary embodiments of the present invention that may be used to form the positive and/or negative plates of battery 100. Chemical reactions in the paste disposed on the current collectors of the battery enable storage and release of energy. The composition of this paste, and not the material selected for the current collector, determines whether a given current collector functions as either a positive or a negative plate.

To create the positive and negative plates of battery 100, a chemically active paste is applied to current collectors 20, 40 such that the chemically active paste penetrates the network of pores in the carbon foam of the current collector. Initially, the chemically active paste that is applied to the current collectors 20, 40 of both the positive and negative plates may be substantially the same in terms of chemical composition. For example, the paste may include lead oxide (PbO). Other oxides of lead may also be suitable. The paste may also include various additives including, for example, varying percentages of free lead, structural fibers, conductive materials, carbon, and extenders to accommodate volume changes over the life of the battery. In practice, the constituents of the chemically active paste may be mixed with a small amount of sulfuric acid and water to form a paste that may be disposed within pores 14 of the current collectors 20, 40.

Once the paste has been deposited on current collectors 20, 40 the positive and negative plates are formed. To create a positive plate, current collectors 20, 40 including lead oxide paste, for example, are subjected to a curing process. This curing process may include exposing the pasted current collectors 20, 40 to elevated temperature and humidity to encourage growth of lead sulfate crystals within the paste. To create the negative plate, current collectors 20, 40 including the lead oxide paste may be left "as is", with the exception of an optional step of drying.

When the positive and negative plates have been assembled together to form the cells of a battery 100 (shown in FIG. 4), battery 100 is subjected to a charging (i.e., formation) process. During this charging process, the cured paste of the positive plate is electrically driven to lead dioxide (PbO2), and the paste of the negative plate is converted to sponge lead. Conversely, during subsequent discharge of the battery 100, the pastes of both positive and negative plates convert toward lead sulfate.

Industrial Applicability

The composite material of the present invention is useful in any of a wide variety of applications where materials with corrosion resistance, high surface area, electrical conductivity, or low weight would be desirable. In one possible application, the composite material of the present invention may serve as a current collector in a battery, such as a lead acid battery, for example. Current collectors may support the chemically active components of the battery and promote the flow of current between terminals of the battery.

Because current collectors 20, 40 include carbon foam, these current collectors resist corrosion even when exposed to sulfuric acid and to the anodic potentials of the positive plate in a lead acid battery. As a result, the battery may offer a significantly longer service life as compared to batteries without carbon foam current collectors.

The carbon foam includes a network of pores, which provides a large amount of surface area for each current collector 20, 40. Current collectors composed of carbon foam may exhibit more than 2000 times the amount of surface area provided by conventional lead current collectors. The large amount of surface area associated with current collectors 20, 40 translates into batteries having large specific energy values. For example, because of the open cell, porous network and relatively small pore size of the carbon foam materials, the chemically active paste of the positive and negative plates is intimately integrated with the conductive carbon material of current collectors 20, 40. Therefore, electrons produced in the chemically active paste at a particular reaction site must travel only a short distance through the paste before encountering the conductive carbon foam of current collectors 20, 40. This current may then be carried by the electrically conductive portion 33 of the electrical connection element 21, for example.

As a result, batteries with carbon foam current collectors 20, 40 may offer improved specific energy and power values. In other words, these batteries, when placed under a load, may sustain their voltage above a predetermined threshold value for a longer time than some conventional batteries, including those having either lead current collectors or graphite plate current collectors. Also, these batteries may discharge more quickly than batteries including either lead current collectors or graphite plate current collectors.

The increased specific power values offered by batteries of the present invention may also translate into reduced charging times. Therefore, the batteries may be suitable for applications in which charging energy is available for only a limited amount of time. For instance, in vehicles, a great deal of energy is lost during ordinary braking. This braking energy may be recaptured and used to charge a battery of, for example, a hybrid vehicle. The braking energy, however, is available only for a short period of time (i.e., while braking is occurring). In view of their reduced charging times, the batteries of the present invention may provide an efficient means for storing such braking energy.

The porous nature of the carbon foam current collectors also creates an improved substrate for retaining the chemically active paste of the energy storage device. By impregnating the paste into pores of the carbon foam current collectors, the paste is less likely to separate from the current collectors. This property is important in vehicle and other applications where vibration is common.

Further, by including carbon foam current collectors having a density of less than about 0.6 g/cm3, a battery may weigh substantially less that batteries including either lead current collectors or graphite plate current collectors. Other aspects and features of the present invention can be obtained from a study of the drawings, the disclosure, and the appended claims.

What is claimed is:

1. A current collector for a battery, comprising:
    a first carbon foam structure including a network of pores;
    a first electrical connection element coupled with the first carbon foam structure;
    an intermediate bonding structure coupled with the first electrical connection element and the first carbon foam structure; and
    a second carbon foam structure, including a network of pores, coupled with the intermediate bonding structure.

2. The current collector of claim 1, wherein the intermediate bonding structure comprises an electrically conductive material.

3. The current collector of claim 2, wherein the first electrical connection element comprises a tab that extends beyond an edge of at least one of the first carbon foam structure and the second carbon foam structure, the tab being electrically coupled with both the first and second carbon foam structures.

4. The current collector of claim 1, wherein the intermediate bonding structure comprises an insulating material.

5. The current collector of claim 4, further comprising a second electrical connection element disposed between the intermediate bonding structure and the second carbon foam structure.

6. The current collector of claim 5, wherein the first and second electrical connection elements each comprise an electrically conductive tab and at least one electrically conductive portion extending from the tab.

7. The current collector of claim 6, wherein the tab of the first electrical connection element is electrically coupled with the first carbon foam structure, and the tab of the second electrical connection element is electrically coupled with the second carbon foam structure.

8. The current collector of claim 6, wherein the at least one electrically conductive portion comprises a metal.

9. The current collector of claim 1, wherein at least one of the first and second carbon foam structures comprises graphite foam.

10. The current collector of claim 1, wherein at least one of the first and second carbon foam structures has a total porosity value of at least about 60%.

11. The current collector of claim 1, wherein at least one of the first and second carbon foam structures has an open porosity value of at least about 90%.

12. The current collector of claim 1, wherein each of the first and second carbon foam structures has an average pore size of between about 0.25 mm and about 2.0 mm.

13. The current collector of claim 1, wherein the intermediate bonding structure permeates at least some of the pores of the first carbon foam structure and at least some of the pores of the second carbon foam structure.

14. The current collector of claim 1, wherein the intermediate bonding structure permeates the pores of the first carbon foam structure by a depth equal to or greater than an average pore size of the first carbon foam structure.

15. The current collector of claim 1, wherein the intermediate bonding structure permeates the pores of the second carbon foam structure by a depth equal to or greater than an average pore size of the second carbon foam structure.

16. The current collector of claim 1, wherein the intermediate bonding structure comprises a polymer.

17. The current collector of claim 16, wherein the intermediate bonding structure comprises polypropylene.

18. The current collector of claim 1, wherein the intermediate bonding structure comprises a metal.

19. A battery comprising:
a housing;
a positive terminal and a negative terminal;
at least one cell disposed within the housing and including at least one positive plate and at least one negative plate connected to the positive terminal and negative terminal, respectively; and
an electrolytic solution filling a volume between the positive and negative plates;
wherein the at least one positive plate further includes
a first carbon foam structure including a network of pores;
a first electrical connection element coupled with the first carbon foam element;
an intermediate bonding structure coupled with the first electrical connection element and the first carbon foam structure;
a second carbon foam structure, including a network of pores, coupled with the intermediate bonding structure; and
a chemically active paste disposed on the first and second carbon foam structures such that the chemically active paste penetrates at least some of the pores of both the first and second carbon foam structures.

20. The battery of claim 19, wherein the intermediate bonding structure permeates at least some of the pores of the first carbon foam structure and at least some of the pores of the second carbon foam structure.

21. The battery of claim 20, wherein the intermediate bonding structure permeates the pores of the first carbon foam structure by a depth equal to or greater than an average pore size of the first carbon foam structure.

22. The battery of claim 20, wherein the intermediate bonding structure permeates the pores of the second carbon foam structure by a depth equal to or greater than an average pore size of the second carbon foam structure.

23. The battery claim 19, wherein at least one of the first and second carbon foam structures comprises graphite foam.

24. The battery of claim 19, wherein at least one of the first and second carbon foam structures has a total porosity value of at least about 60%.

25. The battery of claim 19, wherein at least one of the first and second carbon foam structures has an open porosity value of at least about 90%.

26. The battery of claim 19, wherein each of the first and second carbon foam structures has an average pore size of between about 0.25 mm and about 2.0 mm.

27. A lead acid battery comprising:
a housing;
a positive terminal and a negative terminal external to the housing;
a plurality of cells connected in series between the positive terminal and the negative terminal;
a plurality of positive plates and a plurality of negative plates disposed in alternating series within each of the plurality of cells; and
an electrolytic solution disposed within the housing and filling a volume between adjacent pairs of positive and negative plates;
wherein both the plurality of positive plates and the plurality of negative plates further include a multi-layered structure comprising
a first carbon foam structure including a network of pores;
a first electrical connection element coupled with the first carbon foam structure;
an intermediate bonding structure coupled with the first electrical connection element and the first carbon foam structure;
a second carbon foam structure, including a network of pores, coupled with the intermediate bonding structure; and
a chemically active paste disposed on the first and second carbon foam structures such that the chemically active paste penetrates at least some of the pores of both the first and second carbon foam structures.

* * * * *